May 7, 1940. W. J. HARSHAW ET AL 2,200,170
OPACIFIER FOR VITREOUS ENAMELS
Original Filed Sept. 15, 1938   3 Sheets-Sheet 1

W. J. Harshaw
and
W. O. Stillwell   INVENTOR.

BY William H Brown
ATTORNEY.

May 7, 1940.　　　W. J. HARSHAW ET AL　　　2,200,170
OPACIFIER FOR VITREOUS ENAMELS
Original Filed Sept. 15, 1938　　3 Sheets-Sheet 3

W.J. Harshaw
and
W.D. Stillwell　INVENTOR.

BY　William H Brown
ATTORNEY.

Patented May 7, 1940

2,200,170

UNITED STATES PATENT OFFICE 2,200,170

OPACIFIER FOR VITREOUS ENAMELS

William J. Harshaw, Shaker Heights, and William D. Stillwell, South Euclid, Ohio, assignors to The Harshaw Chemical Company, Elyria, Ohio, a corporation of Ohio Original application September 15, 1938, Serial No. 230,104. Divided and this application November 1, 1939, Serial No. 302,416

9 Claims. (Cl. 106—36.2)

This invention relates to mill addition opacifiers for vitreous enamels.

Opacification of vitreous enamels is accomplished either by smelter additions in the production of an enamel frit or by mill additions to the quenched frit in the production of the enamel slip. Smelter addition opacifiers are often not suitable for mill addition opacification and vice versa.

In our prior United States Patent, No. 2,033,707, we have described pre-calcined mill addition opacifiers capable of imparting to vitreous enamels a high degree of opacification. In enamels wherein we have used opacifiers according to our said patent, we have experienced, especially in the case of titanium containing compositions and to some extent also in zirconium containing compositions, a deficiency of reflectance in the violet. In the case of titanium compositions this deficiency appeared as a distinctly perceptible yellowish coloration in the enamel. Accordingly, it is highly desirable to overcome the indicated tendency to yellow coloration in the enamel by increasing its power of reflectance of violet light.

In accordance with the present invention it now becomes possible to overcome the undesirable tendency to yellow coloration and produce opacifiers similar to those of our said patent but productive of enamels exhibiting desirable high reflectance in the violet end of the visible spectrum.

Figure 1:
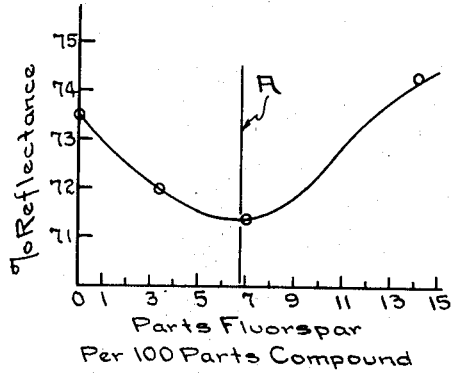
Figure 2:
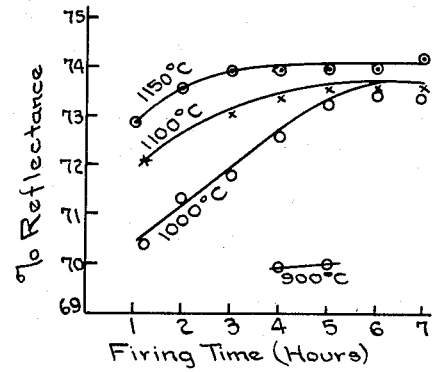
Figure 3:
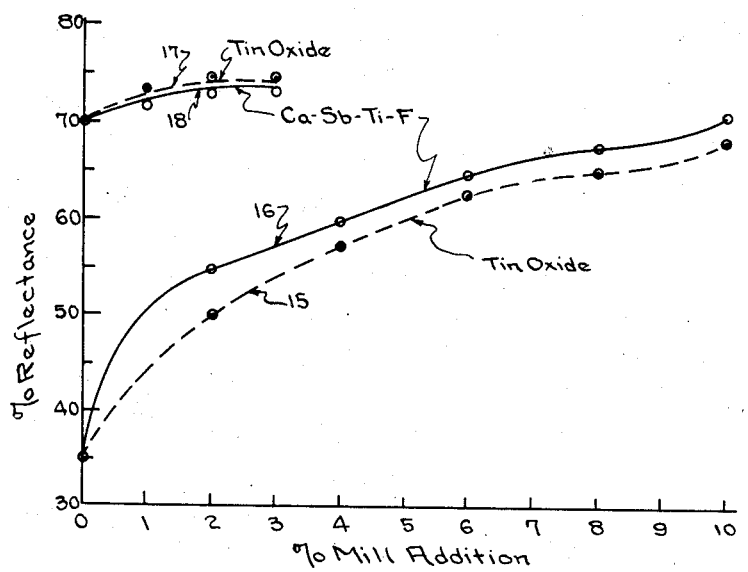

In the drawings, Fig. 1 is a graphic representation of the effect of calcining varying quantities of fluorine material with constant quantities of the other ingredients, in a mill addition opacifier according to the invention, on the opacity and color of a porcelain enamel opacified therewith; Fig. 2 is a graphic representation of the effect of time and temperature of calcination on mill additions, according to the invention, as measured by the opacity of the enamel opacified therewith; Fig. 3 is a graphic representation of the comparative effects of varying amounts of tin oxide and a typical mill addition according to the present invention, on two conventional enamel frits of diverse types as measured by the opacity of the resulting enamel; and, Figs. 4 to 9 inclusive are substantial copies of recording spectrophotometer charts showing the effect of various of the novel mill addition opacifiers on the reflectance of the resulting enamel over the range of the visible spectrum.

We have discovered that certain compositions, the calcination products of suitable quantities of oxides of antimony (either $Sb_2O_5$ or a lower oxide of antimony together with an oxidizing agent such as nitric acid capable of oxidizing such lower oxide to $Sb_2O_5$); oxide of titanium ($TiO_2$) or oxide of zirconium ($ZrO_2$), or suitable materials capable of yielding one or more of the same; a basic oxide (such as CaO, BaO, SrO, MgO, $Al_2O_3$, ZnO, or partial substitutions of alkali metal oxides therefor), or suitable materials capable of yielding the same; and a suitable fluorine containing material (such as $CaF_2$, suitably in the form of fluorspar, $BaF_2$, NaF, $MgF_2$, $Na_2ZrF_6$, $CaZrF_6$, $Na_3AlF_6$, and materials capable on calcination of producing same, such as $MgSiF_6$, $H_2SiF_6$ plus CaO, MgO plus HF, etc.), when used as mill addition opacifiers are capable of producing excellent opacification and with no tendency to yellow coloration of the enamel. If, however, the fluorine material is omitted, a distinct deficiency in reflectance of violet light can be demonstrated, which is slight in the zirconium compositions and more or less pronounced in the case of the titanium compositions.

We believe that complex reactions occur during the calcination but do not completely understand the nature of such reactions. Accordingly, the calcination products of the ingredients used in the production of the novel opacifier compositions are treated as "containing" certain constituent oxides and fluorine material, or as having a certain "composition" without thereby intending to limit the invention to any particular state of combination, solution or admixture of such oxides and fluorine material.

We have discovered that upon employment of increasing quantities of the fluorine containing materials, an increasing improvement is noted in the reflectance of violet light up to a point that the objectionable yellow coloration is no longer perceptible. This bleaching or whitening effect is accompanied by a decrease in opacity (total reflectance of white light) up to about the point where the yellow color is no longer perceptible. Surprisingly, however, still further additions of the fluorine containing materials, gradually increase the opacity of the resulting enamel to a value higher than when no fluorine material was present. Addition of the fluorine containing material as a smelter addition in the production of the frit does not produce the desired effect. The essential distinction between smelter additions and mill additions, is, as is well known, one of heating time, and, where the term "mill addition" or words of like import are used herein, it is intended to cover equivalent procedures where long heating of the opacifier with the frit is avoided. Calcination of the ingredients of the mill addition opacifiers of the present invention, other than the fluorine containing material, followed by incorporation of the separately calcined or uncalcined fluorine-containing material by grinding, produces a mill addition productive of enamels having the objectionable yellow coloration to the same extent as if no fluorine containing material had been added but with slightly lower opacity. Calcination of calcium antimonate with fluorspar or synthetic $CaF_2$, produces a mill addition productive of enamels of lower opacity than if opacified with calcium antimonate alone. Enamels opacified with calcium titanates are white or slightly creamy in color. The addition of fluorspar makes them distinctly yellow and without improving their already poor opacity. We are aware that fluorides are commonly used as smelter additions, but, as stated, they are not effective for our purpose when so used.

We are able to obtain an enamel of very excellent opacity, but deficient in reflectance of violet light, by using as a mill addition opacifier a calcination product of the following composition:

| | Parts by weight |
|---|---|
| CaO | 20 |
| $Sb_2O_5$ | 46 |
| $TiO_2$ | 34 |

If to the batch of which the above composition is the calcination product is added 10 parts by weight of a suitable fluorine material, e. g., fluorspar, and the resulting calcination product is employed as a mill addition opacifier, an enamel is produced which is free from the objectionable yellow coloration.

The sample composition given above is typical but may be varied considerably without departing from the scope of the invention. We prefer to operate, and obtain best results by operating, within the following range of composition.

| | Parts by weight |
|---|---|
| CaO | 18 to 22 |
| $Sb_2O_5$ | 44 to 46 |
| $TiO_2$ | 32 to 34 |
| $CaF_2$ | 5 to 30 |

In Fig. 1 we have shown the results (which are typical) of tests using compositions in which the CaO, $Sb_2O_5$ and $TiO_2$ content was the same and the $CaF_2$ content was varied, as indicated. Approximately 17 parts CaO to 48 parts $Sb_2O_5$ to 35 parts $TiO_2$ were used, the $CaF_2$ content being varied from 3.5 to 14. The vertical line A indicates approximately the point at which the yellow coloration disappeared. At 5 per cent the coloration is very slight.

Our experiments indicate that the fluorine material should have a particle size of from 100 mesh to 200 mesh for best results although the degree of subdivision is not critical.

As above indicated, the oxides need not be employed as such but may be formed from other materials on calcination. Some sample batch compositions are as follows:

| | Parts by weight |
|---|---|
| $CaCO_3$ (precipitated chalk) | 64.5 |
| $Sb_2O_3$ | 75.0 |
| $TiO_2$ | 62.0 |
| $HNO_3$ (conc.) | 32.0 |
| $CaF_2$ (fluorspar) | 38.0 |
| $CaCO_3$ (precipitated chalk) | 64.5 |
| $Sb_2O_3$ | 75.0 |
| $TiO_2$ | 62.0 |
| $HNO_3$ (conc.) | 32.0 |
| $CaF_2$ (fluorspar) | 44.0 |
| $CaCO_3$ | 64.5 |
| $CaF_2$ | 20.0 |
| $Sb_2O_3$ | 75.0 |
| $TiO_2$ | 62.0 |
| $HNO_3$ (conc.) | 32.0 |
| $CaCO_3$ | 40.6 |
| $CaF_2$ | 34.6 |
| $Sb_2O_3$ | 68.6 |
| $TiO_2$ | 56.6 |
| $H_2O$ | 24.0 |
| $Ca(NO_3)_2 \cdot 2H_2O$ | 33.4 |
| ZnO | 44.8 |
| $TiO_2$ | 66.2 |
| $Sb_2O_3$ | 80.0 |
| NaF | 40.0 |
| $HNO_3$ (conc.) | 28.0 |
| $BaCO_3$ | 394 |
| $TiO_2$ | 240.3 |
| $Sb_2O_3$ | 291.5 |
| $CaF_2$ | 105.0 |
| $HNO_3$ (conc.) | 150.0 |
| $NaNO_3$ | 42.5 |
| $CaCO_3$ | 150.0 |
| $TiO_2$ | 240.0 |
| $Sb_2O_3$ | 291.0 |
| NaF | 80.0 |
| $HNO_3$ (conc.) | 115.0 |
| $CaCO_3$ | 100.0 |
| $MgCO_3$ | 168.6 |
| $TiO_2$ | 240.3 |
| $Sb_2O_3$ | 291.5 |
| $MgSiF_6$ | 80.0 |
| $HNO_3$ (conc.) | 80.0 |
| $MgCO_3$ | 253.0 |
| $TiO_2$ | 240.0 |
| $Sb_2O_3$ | 291.5 |
| $MgSiF_6$ | 80.0 |
| $HNO_3$ (conc.) | 80.0 |
| $CaCO_3$ | 59.2 |
| $Sb_2O_3$ | 86.3 |
| $ZrO_2$ | 71.0 |
| $Na_2ZrF_6$ | 30.0 |
| $HNO_3$ (conc.) | 40.0 |

Calcination is carried out at a temperature preferably from 1000° C. to 1150° C., actual batch temperature, and preferably in an oxidizing kiln atmosphere. The time required varies according to the temperature and other conditions, especially the size of the batch, larger batches requiring longer time. As is clear from Fig. 2, the reflectance is nearly fully developed by three hours firing at 1150° C. whereas five or six hours are required at 1000° C. While other temperatures may be used successfully, as indicated in Fig. 2, we prefer five hours or longer at 1000° C. to 1100° C.

The above described mill-addition opacifying compositions are suitable for use in enamel frits generally for production of white enamels. In Fig. 3 we have compared our novel mill addition with tin oxide in a low reflectance enamel (curves 15 and 16), and in a super opaque enamel (curves 17 and 18), using the calcination product of the batch formula first above given. The samples corresponding to the lines 15 and 17 are opacified with tin oxide in the quantities shown, while the samples corresponding to the lines 16 and 18 were opacified with a calcium-antimony-titanium-fluorine composition according to the invention, as indicated.

The following examples will be illustrative of the effect of typical examples of our novel mill additions on the resulting enamels in respect to reflectance of violet light:

Example I

Composition of mill addition:

| | |
|---|---|
| CaO parts by weight | 16.6 |
| $Sb_2O_5$ do | 47.7 |
| $TiO_2$ do | 35.5 |

Amount of mill addition agent added to enamel frit per cent 6

Figure 4:
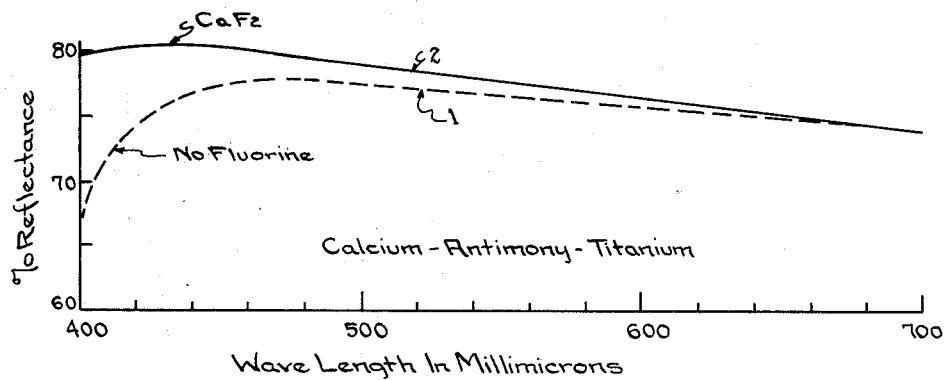

The reflectance of violet light in this case is shown clearly in Fig. 4, wherein reflectance in per cent ($MgCO_3=100\%$) is plotted against wave length of light. This view is a substantial copy of a test sheet made on a recording spectrophotometer. In this view, the line 1 (broken) was produced by an enamel opacified with the above composition; the line 2 (full) was produced by an enamel opacified with a composition similar except being calcined with 10 parts by weight fluorspar.

Example II

Composition of mill addition:

| | |
|---|---|
| ZnO parts by weight | 22.3 |
| $Sb_2O_5$ do | 44.5 |
| $TiO_2$ do | 33.1 |

Amount of mill addition agent added to enamel frit per cent 6

Figure 5:
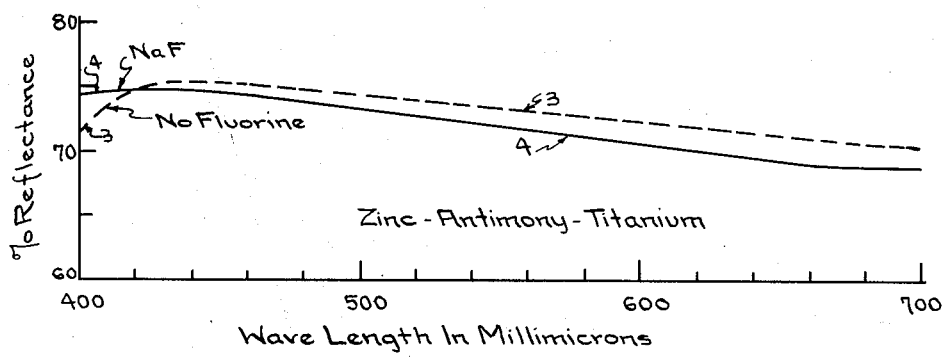

The reflectance of this sample is shown in Fig. 5, the line 3 (broken) being a record of a test on an enamel containing the above opacifier. The line 4 (full) is a record of a test of an enamel opacified with a composition similar to that above except being calcined with 20 parts by weight of sodium fluoride.

Example III

Composition of mill addition:

| | |
|---|---|
| CaO parts by weight | 7.8 |
| $Al_2O_3$ do | 14.2 |
| $Sb_2O_5$ do | 44.6 |
| $TiO_2$ do | 33.4 |

Amount of mill addition agent added to enamel frit per cent 6

Figure 6:
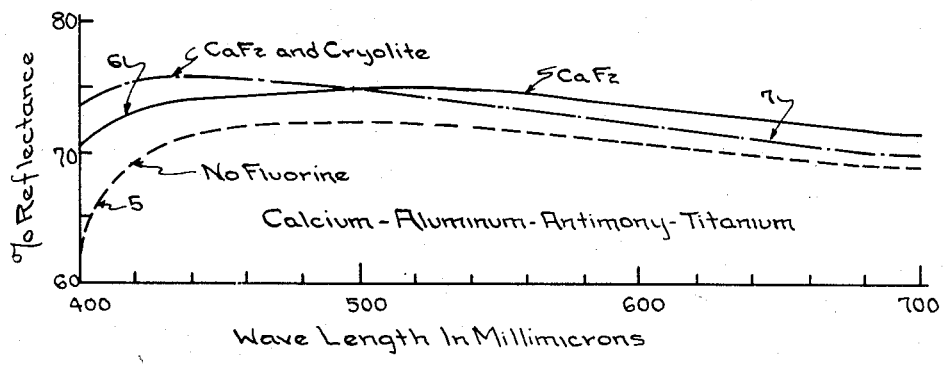

The reflectance of this sample is shown in Fig. 6, the line 5 (broken) being a record of a test on an enamel containing the above opacifier. The line 6 (full) shows the result of a test of an enamel opacified with a composition similar to the above except being calcined with 13% of fluorspar. The line 7 (dot and dash) shows the result of a test on an enamel opacified with a composition like that above except for the substitution of cryolite for a part (25%) of the fluorspar.

Example IV

Composition of mill addition:

| | |
|---|---|
| CaO parts by weight | 14.0 |
| $Sb_2O_5$ do | 40.0 |
| $ZrO_2$ do | 46.0 |

Amount of mill addition agent added to enamel frit per cent 6

Figure 7:
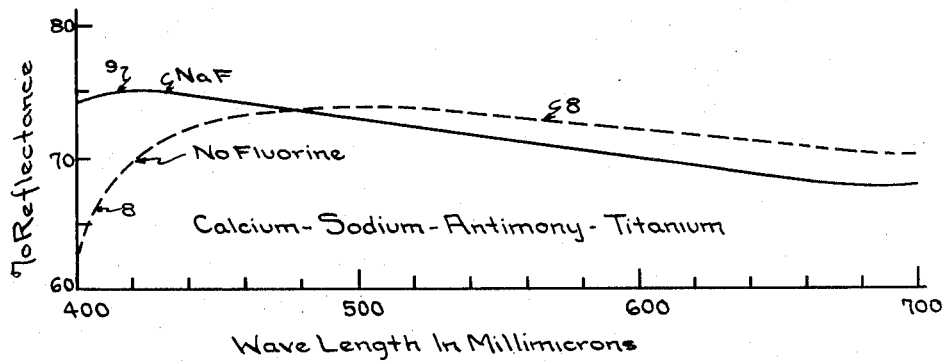

In Fig. 7 we have shown by the line 8 (broken) the reflectance of a porcelain enamel opacified with the above composition and in line 9 (full) the same but opacified with a composition varied in that with the above composition was calcined 11.3% of NaF.

Example V

Composition of mill addition:

| | |
|---|---|
| CaO parts by weight | 14.0 |
| $Sb_2O_5$ do | 40.0 |
| $ZrO_2$ do | 46.0 |

Amount of mill addition agent added to enamel frit per cent 6

Figure 8:
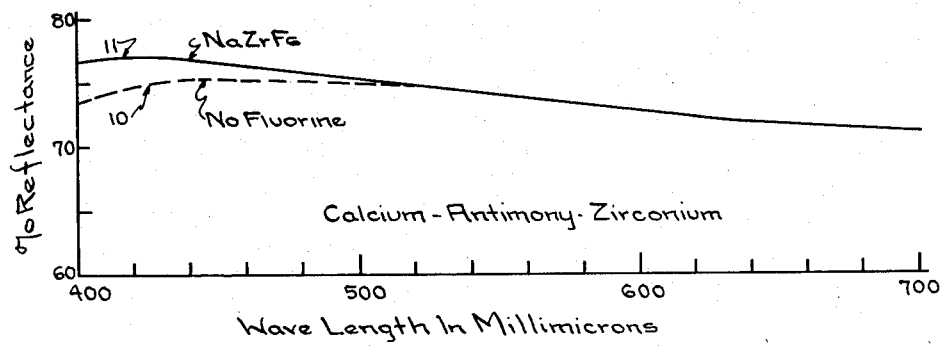

In Fig. 8 we have shown the results of reflectance tests in porcelain enamel of the above opacifier composition (line 10, broken) and a composition similar except for the calcination therewith of 20 parts by weight of $Na_2ZrF_6$ (line 11, full).

Example VI

Composition of mill addition:

| | |
|---|---|
| CaO parts by weight | 23.0 |
| $Sb_2O_5$ do | 45.5 |
| $TiO_2$ do | 31.1 |

Amount of mill addition agent added to enamel frit per cent 6

Figure 9:
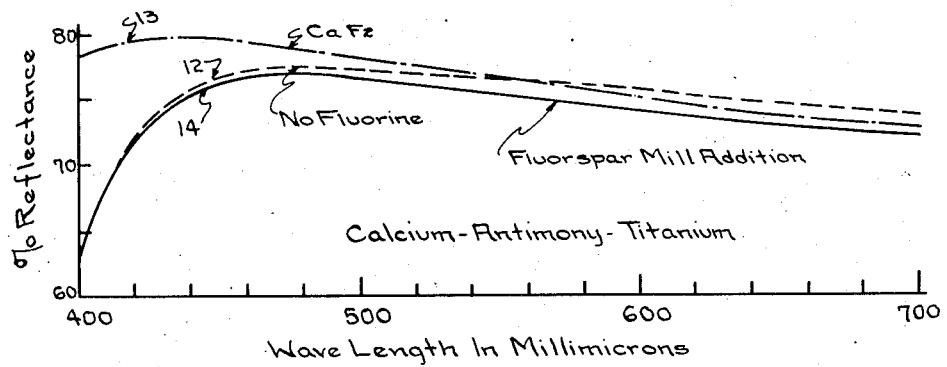

In Fig. 9 we have shown the results of opacification with the above composition (line 12, broken), with the same as varied by calcining therewith 20 parts by weight of fluorspar (line 13, dot and dash), and also as varied by grinding with the calcined composition 20 parts by weight of previously calcined fluorspar (line 14, full). It will be noted that when the fluorine material is calcined with the other constituents of the mill addition, the desired effect is produced.

This application is a division of our co-pending application, Serial No. 230,104, filed September 15, 1938, which was a continuation-in-part of our application, Serial No. 178,760, filed December 8, 1937.

Having thus described our invention, what we claim is:

1. In making a vitreous enamel, firing together an oxide of antimony, available fluorine material, an oxide from the group consisting of titanium and zirconium, an oxide of a base forming metal and an oxidizing agent, mixing the product in a mill charge with enamel frit and grinding.

2. A mill addition opacifier for vitreous enamels, the same being a calcination product, and containing: an oxide of a base forming metal, $Sb_2O_5$, $TiO_2$ and a fluoride.

3. A mill addition opacifier for vitreous enamels, the same being a calcination product containing an oxide of a base forming element, $Sb_2O_5$, $TiO_2$, and a fluoride capable of preventing perceptible yellow coloration of resulting enamels, said fluoride being used in quantity more than sufficient to prevent such coloration.

4. A mill addition opacifier for vitreous enamels, the same containing: ZnO, $Sb_2O_5$, $TiO_2$, and a fluoride.

5. A mill addition opacifier for vitreous enamels, the same being a calcination product and containing approximately:

| | Parts by weight |
|---|---|
| ZnO | 22 |
| $Sb_2O_5$ | 45 |
| $TiO_2$ | 33 | and a fluoride from 5% to 30% of the weight of said oxides.

6. A mill addition opacifier for vitreous enamels, the same containing: BaO, $Sb_2O_5$, $TiO_2$, and a fluoride.

7. A mill addition opacifier for vitreous enamels, the same being a calcination product and containing approximately:

| | Parts by weight |
|---|---|
| BaO | 35.2 |
| $Sb_2O_5$ | 32.4 |
| $TiO_2$ | 24.0 | and $CaF_2$ 5% to 30% of the combined weight of said oxides.

8. A mill addition opacifier for vitreous enamels, the same containing: MgO, $Sb_2O_5$, $TiO_2$, and a fluoride.

9. A mill addition opacifier for vitreous enamels, the same being a calcination product and containing approximately:

| | Parts by weight |
|---|---|
| MgO | 16.2 |
| $Sb_2O_5$ | 48.2 |
| $TiO_2$ | 35.6 | and a fluoride in quantity from 5% to 30% of the combined weight of said oxides.

WILLIAM J. HARSHAW.
WILLIAM D. STILLWELL.